(12) United States Patent
Reissig

(10) Patent No.: US 6,772,582 B2
(45) Date of Patent: Aug. 10, 2004

(54) GAS TURBINE AND AIR TURBINE INSTALLATION AND METHOD OF OPERATING A POWER STATION INSTALLATION, IN PARTICULAR A GAS TURBINE AND AIR TURBINE INSTALLATION

(75) Inventor: Sergej Reissig, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 40 days.

(21) Appl. No.: 10/219,317

(22) Filed: Aug. 16, 2002

(65) Prior Publication Data

US 2004/0011047 A1 Jan. 22, 2004

(30) Foreign Application Priority Data

Aug. 16, 2001 (EP) ............................................. 01119852

(51) Int. Cl.⁷ ................................................ F02C 6/18
(52) U.S. Cl. .................................................... 60/39.183
(58) Field of Search ......................... 60/39.181, 39.183

(56) References Cited

U.S. PATENT DOCUMENTS 4,751,814 A   6/1988  Farrell
5,442,904 A * 8/1995  Shnaid ..................... 60/39.183
6,050,082 A   4/2000  Leonard et al.

FOREIGN PATENT DOCUMENTS

EP          0400701         12/1990
EP          1058073         12/2000

* cited by examiner

*Primary Examiner*—Louis J. Casaregola
(74) *Attorney, Agent, or Firm*—Harness, Dickey & Pierce, P.L.C.

(57) ABSTRACT

A gas turbine and air turbine installation includes a gas turbine to which, downstream of its exhaust gas end, the primary side of a heat exchanger for heating air is connected. In this arrangement, the heat exchanger includes an air turbine connected downstream of its secondary side. By this, a gas turbine and air turbine combined process can be realized which, compared with a pure gas turbine process, is associated with an increase in efficiency and power. The installation concept can be employed particularly advantageously in areas short of water where a conventional gas/steam installation or a steam power installation can hardly be realized because of the requirement for water. Further, a method of operating a power station installation involves waste heat in the exhaust gas of a gas turbine being used to do work to drive an air turbine.

13 Claims, 1 Drawing Sheet

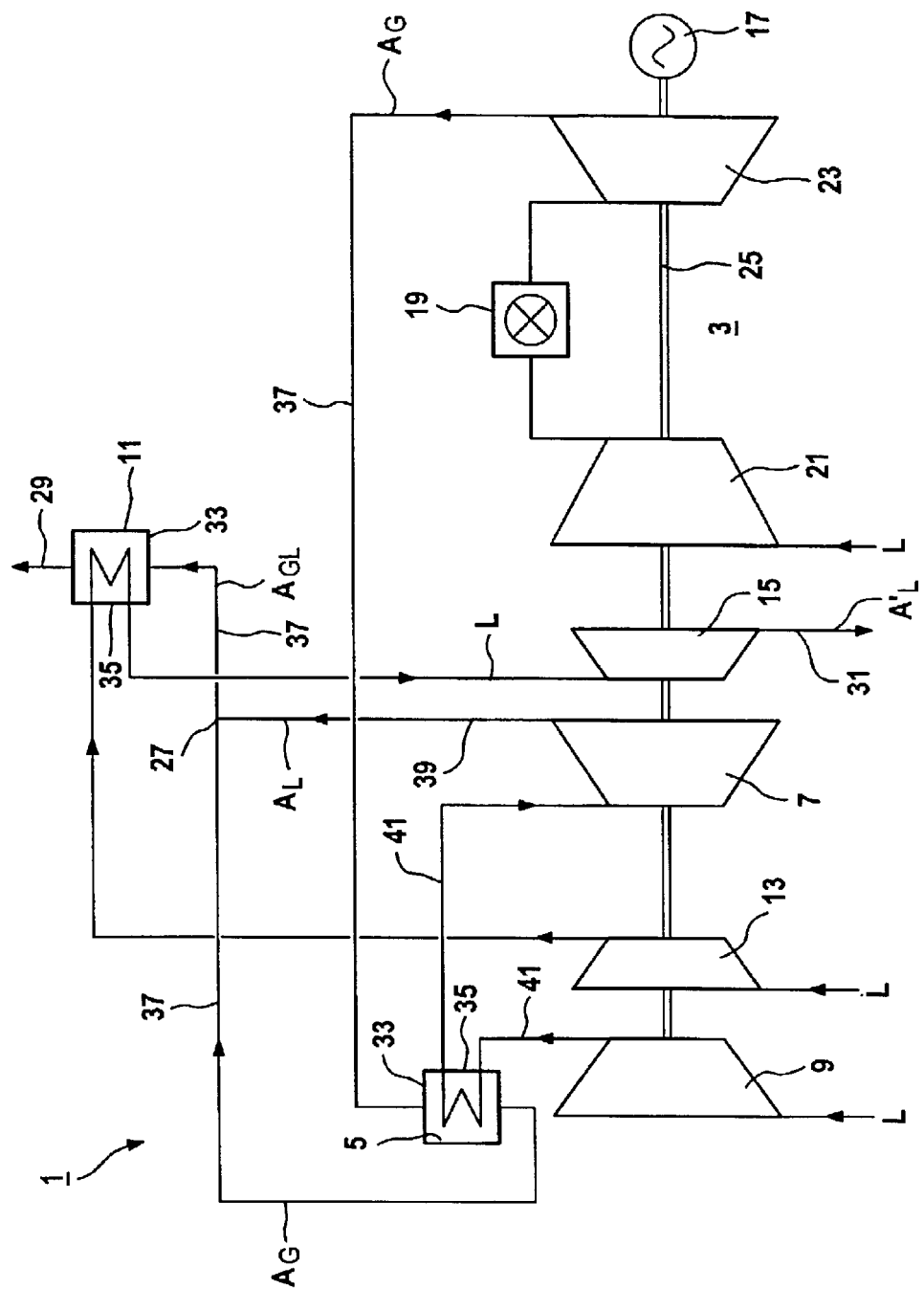

GAS TURBINE AND AIR TURBINE INSTALLATION AND METHOD OF OPERATING A POWER STATION INSTALLATION, IN PARTICULAR A GAS TURBINE AND AIR TURBINE INSTALLATION

This application claims priority on European Patent Application No. 01119852.0, filed Aug. 16, 2001, the entire contest of which are hereby incorporated herein by reference.

FIELD OF THE INVENTION

The invention generally relates to a power station installation and a method of operating a power station installation.

BACKGROUND OF THE INVENTION

Steam power installations are known in which a steam turbine is usually employed in a power station installation for driving a generator or, in an industrial installation, for driving a machine. For this purpose, hot and pressurized steam, which acts as the flow medium and which expands in the steam turbine so as to do work, is supplied to the steam turbine. After its expansion, the steam usually reaches a condenser connected downstream of the steam turbine and condenses there. The condensate is then supplied as feed water to a steam generator and, after its evaporation, again reaches the steam turbine so that there is, in general, a closed water/steam circuit. An installation having the components necessary for this purpose and therefore having, in particular, a steam turbine and a steam generator, is also designated as steam turbines or steam power installation.

Likewise known are power station concepts in which a gas turbine process is combined with a steam turbine process in a joint installation. In a gas turbine and steam turbine process of this type, a waste-heat steam generator is connected downstream of the exhaust gas end of the gas turbine, with the exhaust gas from the gas turbine being used to evaporate water in the waste-heat steam generator. The steam generated in the waste-heat steam generator, utilizing the waste heat from the exhaust gas of the gas turbine, is utilized in a steam turbine installation connected downstream of the waste-heat steam generator, which steam turbine installation generally has a plurality of steam turbines. Such a process has substantial advantages in comparison with the pure gas turbine process. The main advantages are the high efficiency and an increase in power. Efficiencies of up to between 56 and 58% are achieved in modern gas/steam installations.

Both a steam power installation and a gas/steam installation, however, require a substantial quantity of fresh water, or at least desalinated sea water, for the steam generation. For this reason, the operation of the steam power installation or a gas turbine and steam turbine installation presents a problem in countries with a small supply of fresh water, for example in the dry desert countries of Africa. Because of the fresh water requirement of the conventional power station concepts based on steam, therefore, only the pure gas turbine power stations are, as a rule, employed in such regions of the earth. The efficiency of a gas turbine power station is, however, distinctly less than the efficiency of a combined power station or a conventional steam power station.

SUMMARY OF THE INVENTION

An object of an embodiment of the invention is, therefore, to provide a power station installation which permits operation of a gas turbine with improved efficiency. A further object of an embodiment of the invention is to provide a method of operating a power station installation.

A power station installation is achieved, according to an embodiment of the invention, by a gas turbine and air turbine installation, having a gas turbine to which, downstream of its exhaust gas end, the primary side of a heat exchanger for heating air is connected, which heat exchanger has an air turbine connected downstream of its secondary side.

A completely new installation concept is used which—in contrast to the conventional combined power stations having a steam process associated with a gas turbine process for example—permits the utilization of the waste heat in the exhaust gas of the gas turbine, but without involving a steam process. In order to increase the efficiency of a gas turbine installation, the waste heat from the exhaust gas of the gas turbine is, in this case, utilized in a completely novel combined process, namely in a gas turbine and air turbine process. Because fresh water is dispensed with, the gas turbine and air turbine installation of the invention can be employed, particularly advantageously, in regions of the earth where fresh water is only available to a limited extent or can only be obtained at substantial cost.

A particular advantage of this arrangement is that existing gas turbine power stations can be retrofitted, to form a gas turbine and air turbine installation, at a cost which can be appraised. The efficiency advantage, as compared with a pure gas turbine installation, may very rapidly outweigh the investment costs of such a retrofit measure. From initial estimations, the efficiency of the gas turbine and air turbine installation is increased by some 9 to 10 percentage points. The power of such a combined installation, based on a gas and air process, is increased by up to 24% relative to a pure gas turbine process.

Compared with a conventional gas turbine and steam turbine installation, furthermore, there is a markedly reduced requirement with respect to production costs in the case of the gas turbine and air turbine installation according to an embodiment of the invention. This is because essentially lower-cost installation components, such as the heat exchanger and the air turbine, are employed. Compared with this, a steam generator, for example, with a water/steam circuit and the steam turbines downstream, is substantially more expensive in the case of a gas/steam installation and this is so precisely with respect to the material costs.

Depending on the gas turbine type selected, an efficiency of some 45 to 50% can be achieved in the case of the gas turbine and air turbine installation. This installation concept, based on a gas and air process, therefore appears to be particularly interesting in countries which are short of water. The waste heat from the exhaust gas of the gas turbine is used in the heat exchanger, which is connected downstream of the exhaust gas end of the gas turbine, in order to heat air which is supplied to the secondary side of the heat exchanger. The air heated in this way is supplied to the air turbine, which is connected downstream of the heat exchanger and which expands so as to do work.

In a preferred embodiment, an air compressor, which is connected upstream of the secondary side of the heat exchanger, is provided so that compressed air can be supplied to the heat exchanger for heating. In this arrangement, the air is compressed in the air compressor from 1 bar to some 5 to 6 bar. The air compressed in this way is supplied to the heat exchanger so that the compressed air is heated. The employment of an air compressor makes it possible to appropriately increase the pressure condition and temperature condition of the working medium to be supplied to the air turbine, i.e. the compressed and heated air. By this means, more energy is available to the air driving the air turbine, which energy is released to do work on the air turbine for the generation of electricity.

The primary side of a further heat exchanger for heating air is preferably connected downstream of the exhaust gas end of the heat exchanger. Multiple utilization of the waste heat of the exhaust gas flowing out of the gas turbine is possible in this way. A part of the waste heat is first used in the heat exchanger to heat the working medium for the air turbine, i.e. the air. In a second, downstream heat exchanger process, a further part of the waste heat is extracted from the exhaust gas in the further heat exchanger and transferred to air. In analogy with a waste-heat steam generator, it is possible to realize a "waste-heat air generator" by means of this multistage process, in which process—depending on the pressure and temperature condition of the air heated in a waste-heat/air heat exchanger stage—an air turbine can be employed which is specially adapted to the conditions. A multi-stage operation also provides the particular advantage that the output power of the gas turbine and air turbine installation can be adapted, in a simple manner, to the respectively demanded energy requirement, i.e. a high availability.

The air turbine is preferably connected at its exhaust air end to the further heat exchanger. The exhaust air from the air turbine still has a certain heat content, which can be used in a heat exchanger process. The exhaust air, which has been partially expanded and partially cooled in the air turbine, is supplied, in this arrangement, to the further heat exchanger on its primary side so that, on the secondary side of the further heat exchanger, the waste heat can be transferred to a medium, for example a further working medium, such as air at a lower temperature level. Partially cooled exhaust gas from the gas turbine and, at the same time, partially expanded and partially cooled air from the air turbine can therefore be supplied to the primary side of the further heat exchanger.

In this combination, the waste heat from the exhaust gas of the gas turbine and the exhaust air from the air turbine can be used in a particularly advantageous manner. In this arrangement, the exhaust air flow and the exhaust gas flow can be supplied separately, i.e. in separate primary-side main systems, to the further heat exchanger. Alternatively, it can be supplied jointly as an exhaust gas/exhaust air mixture. In the latter case, a mixing location is provided at which the already partially cooled exhaust gas flow is brought together with the exhaust air flow from the air turbine.

The heat exchanger process then takes place downstream of the mixing location in the further heat exchanger, it being possible for the exhaust gas/exhaust air mixture to release heat to a medium, for example air, which is guided on the secondary side of the further heat exchanger. The medium, for example air, guided on the secondary side of the further heat exchanger is correspondingly heated and is available to the gas turbine and air turbine process for the generation of energy.

In a preferred embodiment, the utilization of the heat available in the further heat exchanger can take place by an air compressor being connected upstream of the secondary side of the further heat exchanger, so that compressed air can be supplied to the further heat exchanger for heating. The compression in an air compressor permits higher pressure and temperature conditions to be achieved in the air heated in the further heat exchanger, which is particularly favorable for the further employment of the air, which has been heated and compressed in this way, in the gas turbine and air turbine process. In this arrangement, the air compressor used for this purpose can be different from the air compressor which is connected upstream of the secondary side of the heat exchanger. It is also possible for the air compressors connected upstream of the secondary side of the heat exchanger and the further heat exchanger to be one and the same air compressor, in which case a partial flow of the air compressed in the compressor is respectively supplied to the secondary side of the heat exchanger and the further heat exchanger. It is also possible for compressed air of different pressure conditions to be supplied to the heat exchanger and the further heat exchanger by a respective tapping at a pressure stage of the single air compressor. A flexible adaptation of the installation concept can be undertaken in this case, depending on the availability of an air compressor or the demand on the gas turbine and air turbine installation with respect to efficiency and power. The compressed air, which is extracted from the further air compressor or, if appropriate, from a second pressure stage of the same air compressor, has a pressure condition of, typically, approximately 2 to 2.5 bar.

In a particularly preferred embodiment, a further air turbine is connected downstream of the secondary side of the further heat exchanger. In this way, the waste heat from the exhaust air or the exhaust gas, which is available in the further heat exchanger, can be utilized in a particularly advantageous manner. For this purpose, heat from the exhaust gas or the exhaust gas/exhaust air mixture is transferred in the further heat exchanger to the compressed air guided on the secondary side and the compressed air, which is heated in this way by heat exchange, is available for expansion, so as to do work in the further air turbine. The overall efficiency of the gas turbine and air turbine installation can therefore be further increased by the provision of second air turbines, at least. Each of the air turbines is then associated with a heat exchanger or a heat exchanger stage, so that a multi-stage operation of the gas turbine and air turbine installation can be achieved with particularly effective utilization of the waste heat available from the gas turbine.

The gas turbine and air turbine installation preferably has a generator for converting mechanical energy into electrical energy.

An object directed toward a method of operating a power station installation can be achieved, according to an embodiment of the invention, by a method of operating a power station installation, in particular a gas turbine and air turbine installation according to the above implementations, having a gas turbine in which the waste heat in the exhaust gas of the gas turbine is used to do work to drive an air turbine.

In this arrangement, waste heat in the exhaust gas of a gas turbine is preferably brought into heat exchange with air, air being heated in the heat exchanger and heated air being supplied to the air turbine.

Also preferred is an arrangement in which the air is heated by heat exchange with the exhaust gas and/or with an exhaust gas/exhaust air mixture.

In a further preferred embodiment of the method, the air is compressed and, in particular, the air is compressed before a heat exchange process, so that compressed and heated air can be employed for expansion, so as to do work, in the air turbine.

The advantages of the method occur in an analogous manner to the advantages of the gas turbine and air turbine installation described further above.

BRIEF DESCRIPTION OF THE DRAWINGS

The invention is explained in more detail below using a drawing. In this, the single FIGURE shows a gas turbine and air turbine installation.

DETAILED DESCRIPTION OF THE PREFERRED EMBODIMENTS

The circuit concept of a gas turbine and air turbine installation 1 according to an embodiment of the invention is shown in the FIGURE. In this, the gas turbine and air turbine installation 1 has a gas turbine 3. The gas turbine 3 comprises a turbine 23, a compressor 21 connected upstream of the turbine 23 and a combustion chamber 19 for burning fuel. The gas turbine and air turbine installation 1 further comprises an air turbine 7 and an air compressor 9 associated with the air turbine 7 and connected upstream of it.

The gas turbine 3, the air turbine 7 and the air compressor 9 are arranged on a common shaft 25. It is also, however, quite possible for these installation components not to be arranged on a common shaft but for various shafts to be provided.

In order to generate electrical energy, the gas turbine and air turbine installation has a generator 17, which can be driven by means of the shaft 25. A heat exchanger 5 is connected downstream of the exhaust gas end of the gas turbine 3. For this purpose, an exhaust gas main 37 leads from the turbine 23 to the primary side 33 of the heat exchanger 5. A main 41 leads from the compressor outlet of the air compressor 9 to the air turbine 7. The main 41 is connected into the secondary side 35 of the heat exchanger 5.

In the flow direction of the air L compressed in the air compressor 9, the secondary side of the heat exchanger 5 is, in consequence, connected downstream of the air turbine 7. An exhaust air main 39 is connected to the exhaust air end of the air turbine 7 and, by means of this exhaust air main 39, the exhaust air $A_L$, which has been partially expanded and partially cooled in the air turbine 7, can be removed. Viewed in the flow direction of the exhaust air $A_L$, the exhaust air main 39 opens downstream, at a mixing location 27, into the exhaust gas main 37 associated with the gas turbine 3. In this way, exhaust gas $A_G$ from the gas turbine 3 can be mixed with exhaust air $A_L$ from the air turbine 7, so that an exhaust gas/exhaust air mixture $A_{GL}$ is formed at the mixing location 27.

Viewed downstream of the mixing location 27, the exhaust gas main 37 opens into the primary side 33 of a further heat exchanger 11. The primary side of the further heat exchanger 11 is, in consequence, connected downstream of the exhaust gas end of the heat exchanger 5. The air turbine 7 is likewise connected, at its exhaust gas end, to the further heat exchanger 11. In this arrangement, it is also possible for the exhaust gas main 37 and the exhaust air main 39 not to be joined together at a mixing location 37, as is shown in the FIGURE; a separate connection of the exhaust gas main 37 and the exhaust air main 39 is, instead, conceivable on the primary side 33 of the further heat exchanger 11.

The outlet from the primary side of the further heat exchanger 11, which guides the exhaust gas/exhaust air mixture $A_{GL}$, opens into a chimney 29. An air compressor 13 is connected upstream of the secondary side 35 of the further heat exchanger 11. By this, air L compressed in the air compressor 13 can be supplied to the further heat exchanger 11. A further air turbine 15, which is connected downstream of the secondary side 35 of the further heat exchanger 11, is provided. Air L, which is compressed in the air compressor 13 and heated in the further heat exchanger 11 and which drives the air turbine 15, can be admitted to the further air turbine 15. After expansion, so as to do work, of the air L in the further air turbine 15, the expanded air L leaves the air turbine 15, as exhaust gas $A_L'$, via an air outlet 31 into the atmosphere.

During the operation of the gas turbine and air turbine installation 1, fresh air L from the surroundings is induced by the compressor 21 of the gas turbine 3. The air L is compressed in the compressor 21 and, by this, preheated at the same time. The air L is brought together with a liquid or gaseous fuel in the combustion chamber 19 and is burnt. The hot combustion gases are supplied to the turbine 23, a turbine inlet temperature of approximately 750° C. to 1200° C. being attained for the hot gas. An expansion and a certain cooling of the hot gas takes place in the turbine 23, which hot gas flows through the turbine stages (not represented here in any more detail) of the turbine 23. The still hot exhaust gas $A_G$ in the gas turbine 3 and the air compressed in the air compressor 9 to approximately 5 to 6 bar are led into the heat exchanger 5. In this arrangement, the exhaust gas main 37 is connected to the primary side of the heat exchanger 5, whereas the main 41, which guides the air L from the air compressor 9, is connected to the secondary side of the heat exchanger 5.

At least part of the available waste heat of the exhaust gas $A_G$ is transferred in the heat exchanger 5 to the air L, which has been compressed in the air compressor 9. The air L, which has been compressed and heated in this way, is supplied to the air turbine 7. The air L expands in the air turbine 7 and, in the process, does mechanical work. The exhaust gas $A_G$, which has been partially cooled in the heat exchanger process in the heat exchanger 5, and the exhaust air AL from the air turbine 7 are mixed at the mixing location 27 and, subsequently, the exhaust gas/exhaust air mixture $A_{GL}$ formed in the process is supplied via the exhaust gas main 37 to the primary side 33 of the further heat exchanger 11.

The air L, which has been compressed in the air compressor 13, is supplied to the secondary side 35 of the further heat exchanger and this air L is then heated by the exhaust gas/exhaust air mixture $A_{GL}$ during the heat exchange process. At this point, the air compressed in the air compressor 13 has a pressure of approximately 2 to 2.5 bar. The air L, which has been heated in the further heat exchanger 11, is supplied to the further air turbine 15, where it expands, so as to do work. The mechanical energy from the gas turbine 3 and from the air turbines 7, 15 is converted into electrical energy by the generator 17. In the case of a gas turbine and air turbine installation 1 which is not conceived as a single-shaft configuration, a plurality of generators can also be provided which are associated with respective turbines 3, 7, 15.

An embodiment of the invention involves a new installation concept for a power station installation, in which a gas turbine and air turbine installation is proposed. This has a gas turbine 3, with the primary side of a heat exchanger 5 for heating air being connected downstream of the exhaust gas end of the gas turbine 3 and an air turbine 7 being connected downstream of the secondary side of this heat exchanger 5. During operation of the gas turbine and air turbine installation 1, the waste heat in the exhaust gas $A_G$ of the gas turbine 3 is used to do work to drive the air turbine 7, 15.

In this arrangement, the air L is heated by heat exchange with the exhaust gas $A_G$ and/or an exhaust gas/exhaust air mixture $A_{GL}$ and heated air L is supplied to the air turbine 7, 15. By this, a relatively simple re-equipment or retrofitting of conventional gas turbine power stations is possible, a substantially higher efficiency of approximately 45 to 50%—depending on the gas turbine type selected—being achievable by means of the novel combined process, namely a "gas and air" process. As a result, the gas turbine and air turbine installation 1 is characterized by a higher power, as compared with conventional pure gas turbine power stations. In comparison with known gas turbine and steam turbine installations, a clearly smaller production expenditure is indicated. The gas turbine and air turbine installation 1 of the invention is particularly suitable for operation in regions short of water, where only limited supplies of fresh water are available or where the preparation of water is found to be particularly costly.

1 Gas turbine and air turbine installation
3 Gas turbine
5 Heat exchanger
7 Air turbine
9 Air compressor
11 Further heat exchanger
13 Air compressor
15 Further air turbine
17 Generator
19 Combustion chamber
21 Compressor
23 Turbine
25 Shaft
27 Mixing location
29 Chimney
31 Air outlet (into the atmosphere)
33 Primary side of a heat exchanger
35 Secondary side of a heat exchanger
37 Exhaust gas main
39 Exhaust air main
41 Main
$A_G$ Exhaust gas
$A_L$, $A_L'$ Exhaust air
$A_{GL}$ Exhaust gas/exhaust air mixture
L Air/fresh air The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gas turbine and air turbine installation, comprising:
a gas turbine to which, downstream of its exhaust gas end, a primary side of a heat exchanger for heating air is connected, wherein an air turbine is connected downstream of a secondary side of said heat exchanger, wherein a primary side of a further heat exchanger for heating air is connected downstream of the exhaust gas end of the heat exchanger and wherein the air turbine is connected, at an exhaust air end, upstream of a secondary side of said further heat exchanger.

2. The gas turbine and air turbine installation as claimed in claim 1, further comprising:
an air compressor, connected upstream of the secondary side of the heat exchanger, so that compressed air can be supplied to the heat exchanger for heating.

3. The gas turbine and air turbine installation as claimed in claim 1, further comprising:
an air compressor, connected upstream of the secondary side of the further heat exchanger, so that compressed air can be supplied to the further heat exchanger for heating.

4. The gas turbine and air turbine installation as claimed in claim 1, wherein a further air turbine is connected downstream of the secondary side of the further heat exchanger.

5. The gas turbine and air turbine installation as claimed in claim 1, comprising:
a generator for converting mechanical energy into electrical energy.

6. The gas turbine and air turbine installation as claimed in claim 2, wherein a further air turbine is connected downstream of the secondary side of the further heat exchanger.

7. The gas turbine and air turbine installation as claimed in claim 3, wherein a further air turbine is connected downstream of the secondary side of the further heat exchanger.

8. The gas turbine and air turbine installation as claimed in claim 2, comprising:
a generator for converting mechanical energy into electrical energy.

9. The gas turbine and air turbine installation as claimed in claim 3, comprising:
a generator for converting mechanical energy into electrical energy.

10. An apparatus, comprising:
a gas turbine;
a heat exchanger for heating air, having a primary side connected downstream of an exhaust gas end of the gas turbine;
an air turbine, connected downstream of a secondary side of the beat exchanger; and
a further heat exchanger for heating air, having a primary side connected downstream of the exhaust gas end of the heat exchanger, wherein the air turbine is connected at an exhaust air end upstream of a secondary side of said further heat exchanger.

11. The gas turbine and air turbine installation as claimed in claim 10, further comprising:
an air compressor, connected upstream of the secondary side of the heat exchanger, so that compressed air can be supplied to the heat exchanger for heating.

12. The gas turbine and air turbine installation as claimed in claim 10, further comprising:
an air compressor, connected upstream of the secondary side of the further heat exchanger, so that compressed air can be supplied to the further heat exchanger for heating.

13. The gas turbine and air turbine installation as claimed in claim 10, wherein a further air turbine is connected downstream of the secondary side of the further heat exchanger.

* * * * *